(12) United States Patent
Kim et al.

(10) Patent No.: US 10,093,318 B2
(45) Date of Patent: Oct. 9, 2018

(54) METHOD OF CONTROLLING LAUNCH OF VEHICLE

(71) Applicant: Hyundai Motor Company, Seoul (KR)

(72) Inventors: Jin Sung Kim, Hwaseong-si (KR); Ju Hyun Nam, Bucheon-si (KR)

(73) Assignee: Hyundai Motor Company, Seoul (KR)

(*) Notice: Subject to any disclaimer, the term of this patent is extended or adjusted under 35 U.S.C. 154(b) by 135 days.

(21) Appl. No.: 15/364,017

(22) Filed: Nov. 29, 2016

(65) Prior Publication Data

US 2017/0369065 A1 Dec. 28, 2017

(30) Foreign Application Priority Data

Jun. 28, 2016 (KR) .................. 10-2016-0080884

(51) Int. Cl.
*B60W 30/18* (2012.01)
*B60W 10/02* (2006.01)
*B60W 10/06* (2006.01)
*B60W 50/00* (2006.01)

(52) U.S. Cl.
CPC ...... *B60W 30/18027* (2013.01); *B60W 10/02* (2013.01); *B60W 10/06* (2013.01); *B60W 50/00* (2013.01); *B60W 2050/0048* (2013.01); *B60W 2510/0275* (2013.01); *B60W 2510/0638* (2013.01); *B60W 2510/0657* (2013.01); *B60W 2510/0695* (2013.01); *B60W 2510/102* (2013.01); *B60W 2540/10* (2013.01);

(Continued)

(58) Field of Classification Search
None
See application file for complete search history.

(56) References Cited

U.S. PATENT DOCUMENTS 6,087,734 A * 7/2000 Maeda ............... B60W 20/10
180/65.21
2009/0186743 A1* 7/2009 Fodor ............. B60W 30/18027
477/86

(Continued)

FOREIGN PATENT DOCUMENTS

| JP | 9-24750 A | 1/1997 |
| JP | 9-25951 A | 1/1997 |
| JP | 2002-081472 A | 3/2002 |

(Continued)

*Primary Examiner* — Justin Holmes
(74) *Attorney, Agent, or Firm* — Morgan, Lewis & Bockius LLP

(57) ABSTRACT

A method of controlling launch of a vehicle, may include setting step in which a controller sets a basic target engine speed; a transient control step in which the controller controls a clutch torque based on the basic target engine speed; a transient state determining step in which the controller determines, whether a transition period of change of the engine speed elapsed; a first correction amount determination step in which the controller determines a correction amount; a correction applying step in which the controller adds the correction amount to the predetermined target engine speed and then determines a final target engine speed; an error determination step in which the controller determines the engine speed control error; and a feedback determination step in which the controller uses the engine speed control error and determines a feedback control amount for feedback-controlling a clutch actuator.

7 Claims, 5 Drawing Sheets

(52) U.S. Cl.
CPC . *B60W 2710/022* (2013.01); *B60W 2710/027* (2013.01); *B60W 2710/0644* (2013.01)

(56) References Cited

U.S. PATENT DOCUMENTS

2011/0320077 A1* 12/2011 Choi .................. B60K 6/48
 701/22
2012/0109439 A1* 5/2012 Akebono ............. B60W 10/02
 701/22

FOREIGN PATENT DOCUMENTS

| | | | |
|---|---|---|---|
| JP | 2008-045609 A | 2/2008 |
| KR | 10-2011-0107066 A | 9/2011 |
| KR | 10-2014-0085601 A | 7/2014 |
| KR | 10-2014-0148426 A | 12/2014 |
| KR | 10-2016-0034376 A | 3/2016 |
| WO | WO 2013/161718 A1 | 10/2013 |
| WO | WO 2015/037437 A1 | 3/2015 |

* cited by examiner

METHOD OF CONTROLLING LAUNCH OF VEHICLE

CROSS REFERENCE TO RELATED APPLICATION

The present application claims priority of Korean Patent Application No. 10-2016-0080884 filed on Jun. 28, 2016, the entire contents of which is incorporated herein for all purposes by this reference.

BACKGROUND OF THE INVENTION

Field of the Invention

The present invention relates to a method of controlling launch of a vehicle, and more particularly to a method of controlling launch of a vehicle equipped with a dual clutch transmission (DCT) that implements a dual clutch by a dry clutch or a vehicle equipped with an automated manual transmission (AMT) when the vehicle launches to start from standstill.

Description of Related Art

The launch control for launching a DCT vehicle having a dry clutch is referred to a control that under the state that an engine is idling and the vehicle is standstill, allows an engine to speed up to a desired speed and at the same time allows the clutch to be coupled gradually by adjusting clutch torque with respect to engine torque generated as the driver depresses an accelerator pedal.

In other words, a target engine speed is determined in response to depression of the accelerator pedal by the driver, and then the clutch is forced to be coupled gradually so as to follow the engine speed.

For your information, unless stated otherwise, the term "clutch" as used herein means a dry clutch constituting a dual clutch of DCT or a clutch of AMT.

Since the clutch torque varying according to a degree of coupling of the clutch acts as load for changing the engine speed when controlling launch of the vehicle, the clutch torque is feedback-controlled in real time with respect to the engine torque according to an operation amount of the accelerator pedal by the driver in order to allow the clutch to follow a target engine speed. Accordingly, if the feedback-control is not performed appropriately, jerking or shock or stall of the engine occurs and hence the launch feeling of the vehicle is deteriorated.

By the way, since the engine torque and clutch torque received by a controller for controlling a transmission such as DCT or AMT are not correct actual values, but values estimated from a map and the like, they exhibit a tendency to be incorrect depending on conditions of the vehicle, which influences on the launch control based on such torques, with the result that it is difficult to adequately ensure the launch performance of the vehicle.

In particular, in case where the vehicle launches on an uphill road and the like, there occurs a situation that performing an appropriate launch control becomes more difficult due to variation in a climbing angle in addition to the inaccuracy of the engine torque and clutch torque as described above. In some cases, durability of the clutch can be reduced due to excessive slip occurred in the clutch.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling launch of the vehicle, which allows a clutch to be controlled more properly despite inaccuracy of the engine torque and a clutch torque, upon launch control to force a dry clutch to be coupled and start the vehicle, improving launch performance and merchantability of the vehicle.

Further, another object of the present invention is to contribute to enhancing durability of the clutch by controlling a target engine speed to be lowered according to a situation when the vehicle launches with high load, such as the time when the vehicle travels on an uphill road, such that a heat generation amount of the clutch is suppressed. A method of controlling launch of the vehicle for accomplishing objects of the present invention as described above, includes: a basic setting step in which a controller sets a predetermined target engine speed of the engine according to an operation amount of an accelerator pedal; a transient control step in which the controller controls a clutch torque based on the basic target engine speed; a transient state determining step in which the controller determines, during performing of the transient control step, whether a transition period of change of the engine speed elapsed; a first correction amount determining step in which when it is determined as a result of performing the transient state determining step that the transition period of change of the engine speed elapsed, the controller determines a correction amount by using a difference between a measured engine speed input and the basic target engine speed; a correction applying step in which the controller adds the correction amount to the predetermined target engine speed and then determines a final target engine speed; an error determining step in which the controller determines the engine speed control error by using a difference between the final target engine speed and the measured engine speed; a feedback determining step in which the controller uses the engine speed control error and determines a feedback control amount for feedback-controlling a clutch actuator, wherein the controller performs steps from the correction applying step to the feedback determining step repeatedly until the launch of the vehicle is completed and wherein a correction amount required for the correction applying step at a time of the repeated performing of the steps is determined by a second correction amount determining step in which a previous correction amount is multiplied by a forgetting factor determined by reflecting a speed change amount of an input shaft of a transmission.

In the transient state determining step, when the engine torque is greater than a predetermined reference engine torque, the clutch torque is greater than a predetermined reference clutch torque, and the measured engine speed change amount is less than a predetermined reference change amount, the controller may determine that the transition period of change of the engine speed elapsed.

The forgetting factor used in the second correction amount determination step is a value greater than 0 and not more than 1, wherein the forgetting factor may be set to a value close to 1 as the speed change amount of the input shaft of the transmission becomes larger.

The controller further performs a feed-forward value determination step for determining a feed-forward value for controlling the clutch actuator in response to the engine torque and the operation amount of the accelerator pedal, wherein the controller may be configured to control the clutch actuator by adding the feedback control amount determined in the feedback determination step to the feedforward value.

The controller may be configured to determine the feedforward value by using a difference value obtained by subtracting the product of the change amount of the target engine speed according to the operation amount of the accelerator pedal by a moment of rotational inertia of the engine from the engine torque.

According to another aspect of the present invention, there is provided a method of controlling launch of the vehicle, including: a basic setting step in which a controller sets a predetermined target engine speed of the engine according to an operation amount of an accelerator pedal; a transient control step in which the controller feedback controls a clutch torque based on the predetermined target engine speed and an engine speed to be measured; a transient state determining step in which the controller determines, during performing of the transient control step, whether a transition period of change of the engine speed elapsed based on whether the engine speed change amount is less than a predetermined reference engine speed; a first correction amount determination step in which when it is determined as a result of performing the transient state determining step that the transition period of change of the engine speed elapsed, the controller determines a correction amount by using a difference between a measured engine speed input and the basic target engine speed; a second correction amount determination step in which the previous correction amount is multiplied by a forgetting factor determined by reflecting the vehicle speed change amount; a correction applying step in which the controller adds the correction amount to the predetermined target engine speed and then determines a final target engine speed; an error determination step in which the controller determines the engine speed control error by using a difference between the final target engine speed and the measured engine speed; a feedback determination step in which the controller uses the engine speed control error and determines a feedback control amount for feedback-controlling a clutch actuator, wherein the controller performs steps from the correction applying step to the feedback determination step repeatedly until the launch of the vehicle is completed and wherein a correction amount required for the correction applying step uses, at the first time, a correction amount obtained by the first correction amount determination step and then, at a time of the repeated performing of the steps, a correction amount obtained by the second correction amount determination step.

The forgetting factor used in the second correction amount determination step is a value greater than 0 and not more than 1, wherein the forgetting factor may be set to a value close to 1 as the speed change amount of the vehicle becomes larger.

According to an exemplary embodiment of the present invention, it is possible to allow a clutch to be controlled more despite inaccuracy of an engine torque and a clutch torque upon launch control to force a dry clutch to be coupled and start the vehicle, thereby improving launch performance and merchantability of the vehicle.

Further, it is possible to enhance durability of the clutch by controlling a target engine speed to be lowered according to a situation when the vehicle launches with high load, such as a time when the vehicle travels on an uphill road, such that a heat generation amount of the clutch is suppressed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
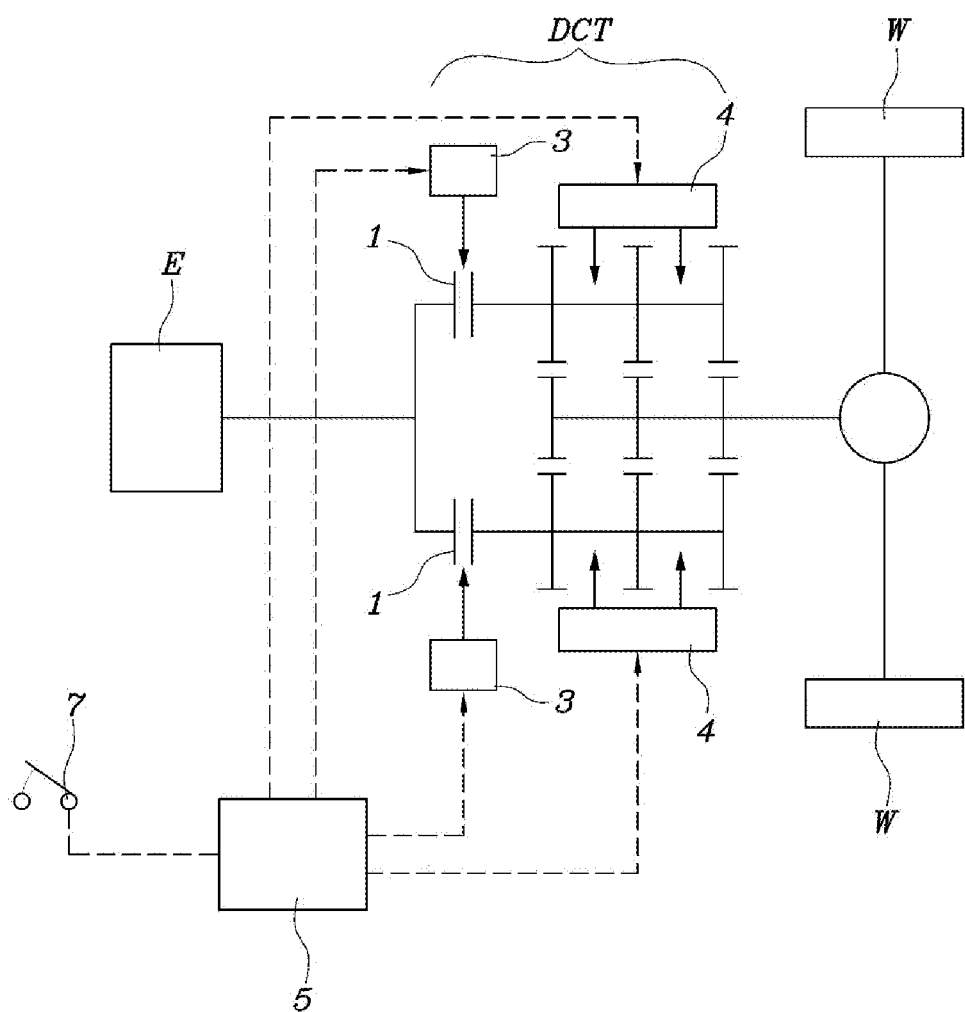
FIG. 1 is a block diagram of a vehicle equipped with DCT, to which the present invention can be applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, it can be seen that power of an engine E is configured to be delivered to drive wheels W via a dual clutch transmission (DCT); each of two clutches 1 constituting the DCT is controlled by a clutch actuator 3; each of change gears forming a respective shift stage is shifted by a shift actuator 4 which selects and operates synchronizers; the clutch actuator 3 and the shift actuator 4 are configured to be controlled by a controller 5; and the controller is configured to receive signals from an accelerator position sensor (APS) 7 to receive an operation amount of an accelerator pedal.

In addition, the controller 5 is of course configured to receive information of an engine torque, an engine speed and the like.

Figure 2:
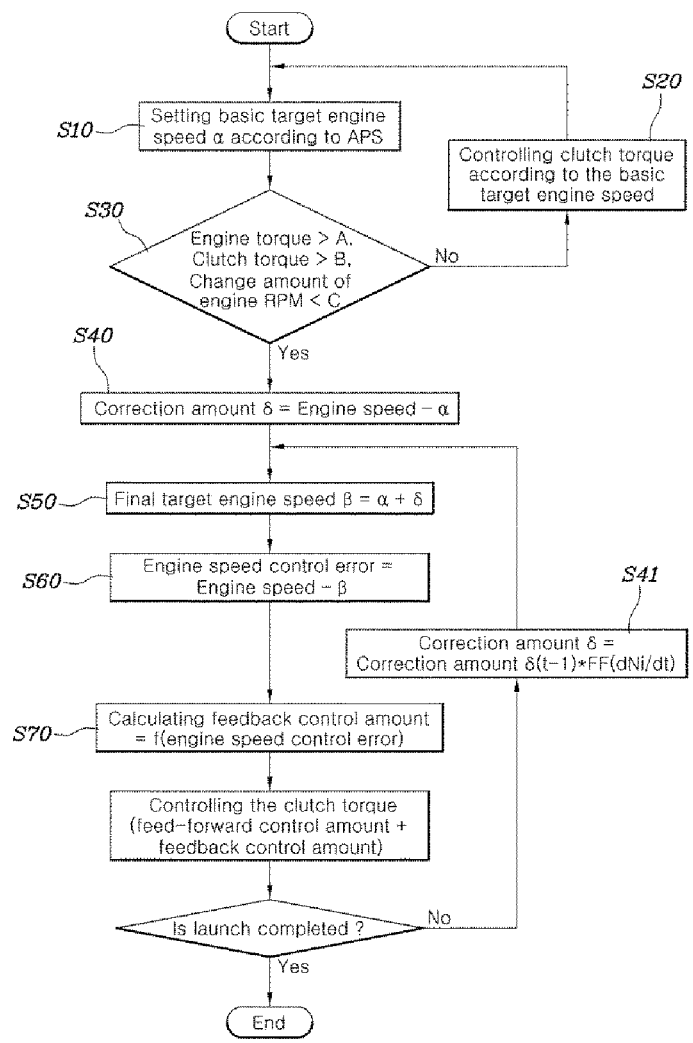
FIG. 2 is a flow chart illustrating an embodiment of a method of controlling launch of the vehicle, according to an exemplary embodiment of the present invention.

Referring to FIG. 2, an exemplary embodiment of a method of controlling launch of the vehicle, according to an exemplary embodiment of the present inventions, includes a basic setting step S10 in which a controller 5 sets a predetermined target engine speed α of the engine according to an operation amount of an accelerator pedal; a transient control step S20 in which the controller 5 controls a clutch torque based on the basic target engine speed; a transient state determining step S30 in which the controller 5 determines, during performing of the transient control step S20, whether a transition period of change of the engine speed elapsed; a first correction amount determination step S40 in which when it is determined as a result of performing the transient state determining step S30 that the transition period of change of the engine speed elapsed, the controller 5 determines a correction amount δ by using a difference between a measured engine speed input and the basic target engine speed; a correction applying step S50 in which the controller 5 adds the correction amount δ to the predetermined target engine speed α and then determines a final target engine speed β; an error determination step S60 in which the controller 5 determines the engine speed control error by using a difference between the final target engine speed and the measured engine speed; and a feedback determination step S70 in which the controller 5 uses the engine speed control error and determines a feedback control amount for feedback-controlling a clutch actuator, wherein the controller 5 performs steps from the correction applying step S50 to the feedback determination step S70 repeatedly until the launch of the vehicle is completed and wherein a correction amount required for the correction applying step S50 at a time of the repeated performing of the steps is determined by a second correction amount determination step S41 in which a previous correction amount is multiplied by a forgetting factor FF determined by reflecting a speed change.

That is, in an exemplary embodiment of the present invention, when launch of the vehicle is controlled by driver's operation of an accelerator pedal, controlling the engine speed according to an operation amount of the accelerator pedal is performed such that (i) during a transition period that the engine speed increases, a feedback control is performed by the transient control step S20 such that the engine speed follows the basic target engine speed, and (ii) after the transition period elapsed, a feedback control is performed such that the correction amount that is the difference between the engine speed measured actually and the predetermined target engine speed is determined, the predetermined target engine speed is offset by the correction amount, the final target engine speed is determined, and then the engine speed follows the final target engine speed. In addition, when the vehicle travels on an uphill road where increase of the vehicle speed is tardy or the vehicle launches with high load, the correction amount determined for the first time after the transition period elapsed is reduced by applying the forgetting factor to the correction amount according to the speed change amount of the input of the transmission, and in turn the final target engine speed returns back to the initial basic target engine speed. As a result, excessive slip of the clutch is prevented so that heat generation of the clutch is suppressed and hence durability and launch performance are enhanced.

Further, the present invention is intended to control engine speed by considering the correction amount and the clutch by varying the correction amount according to the speed change amount of the input shaft of the transmission, in addition to controlling the engine speed based on the predetermined target engine speed according to the operation amount of the accelerator pedal as described above, thereby obtaining an effect of reducing a control error in feedback controlling the engine speed to a target engine speed.

In the basic setting step S10, the predetermined target engine speed α is set according to the current operation amount of the accelerator pedal input to the controller 5, based on a map of basic target engine speeds of the engine according to operation amounts of an accelerator pedal.

It is noted that the map of basic target engine speeds according to operation amounts of an accelerator pedal is established in advance through a number of tests and analysis of basic target engine speeds required for smooth launch of a vehicle with respect to operation amounts of an accelerator pedal.

In the transient state determining step S30, when the engine torque is greater than a predetermined reference engine torque A, the clutch torque is greater than a predetermined reference clutch torque B, and the measured engine speed change amount is less than a predetermined reference change amount C, the controller 5 determines that the transition period of change of the engine speed elapsed.

It is noted that the reference engine torque A, the reference clutch torque B, and the reference change amount C are established to such a degree that determining whether or not operation of the engine and the clutch actuator passes over the transient state so that engine speeds measured are reliable can be made in accordance with concepts of the present exemplary embodiment and their values are set through a number of tests and analysis of the vehicle in question.

The first correction amount determination step S40 is to determine the correction amount δ for the first time when it is determined by the transient state determining step S30 that the transition period elapsed, wherein the correction amount δ is determined by subtracting the predetermined target engine speed α from the measured engine speed input.

In the correction applying step S50, the final target engine speed β is determined by adding correction amount δ to the predetermined target engine speed α, resulting that the predetermined target engine speed is forced to be offset by the correction amount.

Figure 4:
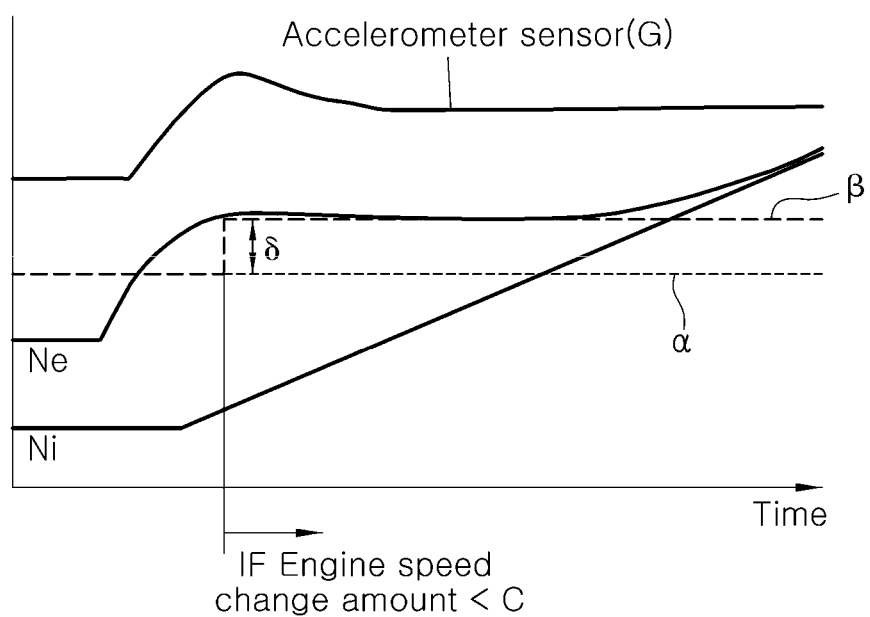
FIG. 4 and FIG. 5 are graphs illustrating a method of controlling launch of the vehicle, according to an exemplary embodiment of the present invention.

FIG. 4 shows a situation that a launch process of the vehicle is completed as it is at the final target engine speed generated by offsetting the predetermined target engine speed by the correction amount determined in the first correction amount determination step S40. This situation occurs for example on a level ground or a downhill road and is considered as a situation that a forgetting factor in the second correction amount determination step S41 is equal to 1 and the vehicle is accelerated.

In the error determination step S60, the engine speed control error is determined by using a difference between the final target engine speed β and the current engine speed, as described above. In the feedback determination step S70, the feedback control amount is determined by using the engine speed control error, wherein the feedback control amount may be determined as a proportional integral (PI) control value and the like and it is used for determining the final control clutch torque for controlling the clutch along with the feed forward value as described later.

The second correction amount determination step S41 determines the correction amount δ used in the correction applying step S50 rather than the first correction amount determination step S40 when steps from the correction applying step S50 to the feedback determination step S70 are performed repeatedly until the launch of the vehicle is completed after the first correction amount determination step S40 is performed and then the correction applying step S50 and the error determination step S60 and the feedback determination step S70 are performed once.

The forgetting factor FF used in the second correction determination step S41 is a value greater than 0 and not more than 1, wherein the forgetting factor is set to a value close to 1 as the speed change amount of the input shaft of the transmission becomes larger.

Figure 5:
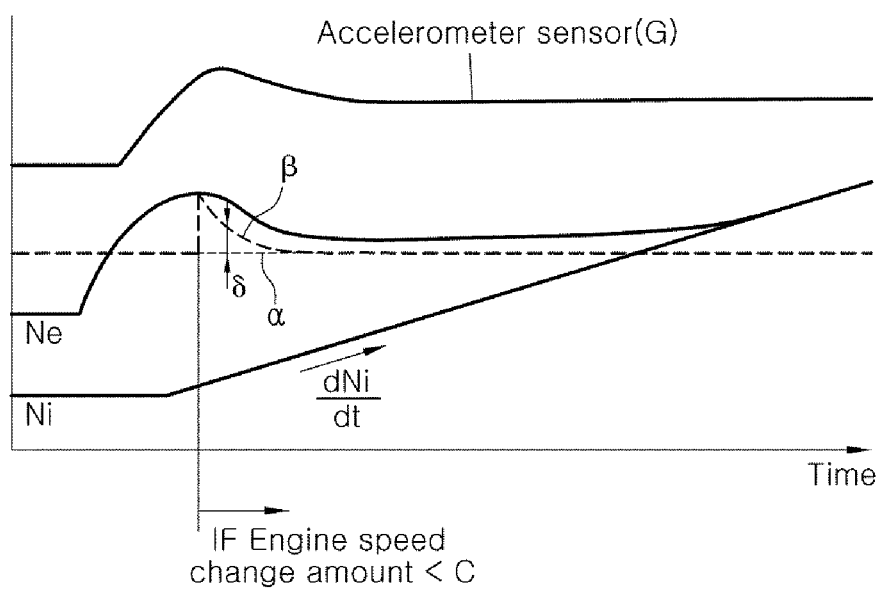

In other words, in the second correction amount determination step S41, at the first time, the correction amount is updated by multiplying the correction amount determined in the first correction amount determination step S40 by the forgetting factor. Afterwards, the correction amount is again updated by multiplying a correction amount δ(t−1) used in the preceding control cycle, i.e., determined in the second correction amount determination step S41 of the preceding control cycle by the forgetting factor FF. Consequently, if the forgetting factor is set to a value less than 1, the correction amount is gradually reduced as shown in FIG. 5, and the final target engine speed β converges to the predetermined target engine speed α.

This is intended to allow the correction amount determined for the first time after the transition period by the first correction amount determination step S40 to be updated to a smaller value gradually by the second correction amount determination step S41 when the vehicle launches on an uphill road where increase of the vehicle speed is tardy or the vehicle launches with high load, such that the final target engine speed returns back to the initial predetermined target engine speed and, in turn, a slip amount of the clutch is reduced and hence excessive slip of the clutch is prevented so that heat generation of the clutch is suppressed, thereby enhancing durability and launch performance.

The forgetting factor may be set based on the vehicle speed change amount instead of the speed change amount of the input shaft of the transmission as mentioned above. The reason is that when no shift is performed when vehicle launches, the vehicle speed change amount and the speed change amount of an input shaft of the transmission would represent substantially the same behavior.

Figure 3:
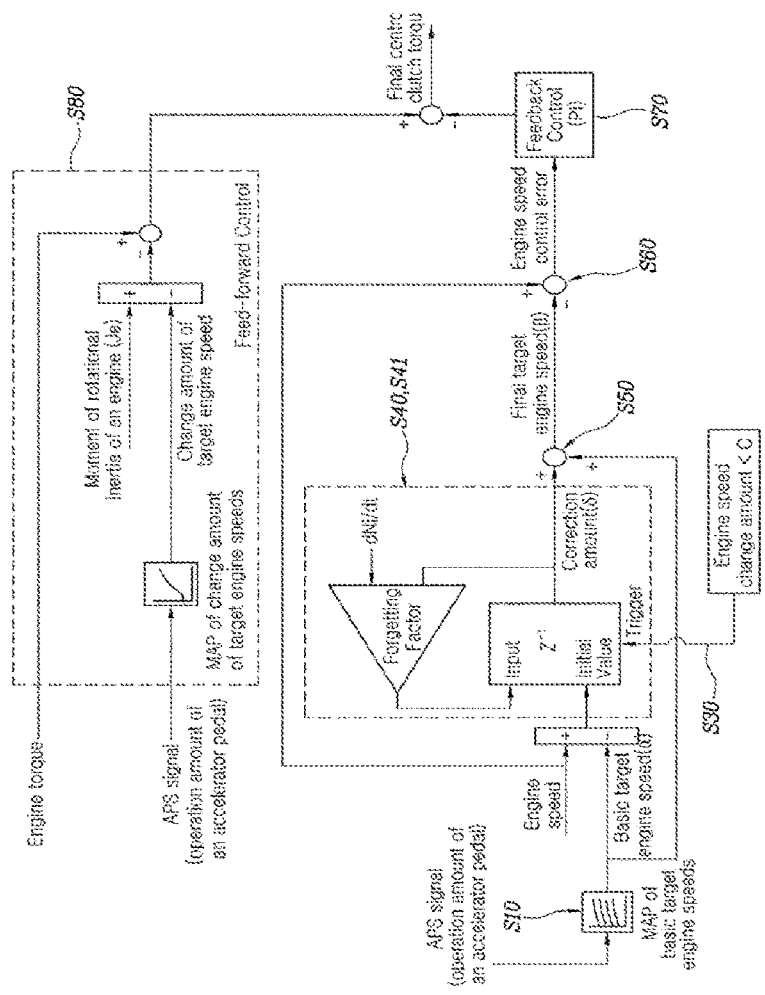
FIG. 3 is a control block diagram illustrating a method of controlling launch of the vehicle, according to an exemplary embodiment of the present invention.

On the other hand, referring to FIG. 3, the controller 5 further performs a feed-forward value determination step S80 for determining a feed-forward value for controlling the clutch actuator according to the engine torque and the operation amount of the accelerator pedal, wherein the controller is configured to control the clutch actuator by adding the feedback control amount determined in the feedback determination step S70 to the feed-forward value.

The controller 5 determines the feed-forward value by using a difference value obtained by subtracting the product of the change amount of the target engine speed according to the operation amount of the accelerator pedal by a moment of rotational inertia of the engine from the engine torque.

The controller 5 has a map of change amounts of a target engine speed for smooth launch of a vehicle with respect to operation amounts of an accelerator pedal and determines as a feed forward value a value obtained by subtracting the product of the change amount of the target engine speed according to the operation amount of the accelerator pedal by the moment of rotational inertia of the engine from the current engine torque.

The feed forward value corresponds to a clutch torque for ensuring a desired level of the vehicle launch state in response to operation of an accelerator pedal by the driver. This is intended to form a final control clutch torque by allowing a feedback control amount according to the engine speed control error to be added thereto and control a clutch actuator based on such final control clutch torque, so that rapid and precise control of the clutch torque is facilitated and smooth and soft launch feeling of the vehicle is ensured.

In other words, according to an exemplary embodiment of the present invention, controlling the clutch torque at the initial time of the launch of the vehicle is performed by adding the feedback value according to the predetermined target engine speed to the feed-forward value, whereas when the engine and the clutch are in a stable state after the transient state passes over, controlling the clutch torque is performed by adding the feedback value according to the final target engine speed to the feed-forward value and then the launch of the vehicle is completed. For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling launch of a vehicle, comprising:
   a setting step in which a controller sets a predetermined target engine speed of an engine according to an operation amount of an accelerator pedal;
   a transient control step in which the controller controls a clutch torque based on the predetermined target engine speed;
   a transient state determining step in which the controller determines, during performing of the transient control step, when a transition period of change of the engine speed elapsed;
   a first correction amount determination step in which when it is determined as a result of performing the transient state determining step that the transition period of change of the engine speed elapsed, the controller determines a correction amount by using a difference between a measured engine speed input and the predetermined target engine speed;
   a correction applying step in which the controller adds the correction amount to the predetermined target engine speed and then determines a final target engine speed;
   an error determination step in which the controller determines an engine speed control error by using a difference between the final target engine speed and the measured engine speed; and
   a feedback determination step in which the controller uses the engine speed control error and determines a feedback control amount for feedback-controlling a clutch actuator,
   wherein the controller performs steps from the correction applying step to the feedback determination step repeatedly until the launch of the vehicle is completed and wherein a second correction amount required for the correction applying step at a time of the repeated performing of the steps is determined by a second correction amount determination step in which a previous correction amount is multiplied by a forgetting factor determined by reflecting a speed change amount of an input shaft of a transmission.

2. The method of claim 1, wherein in the transient state determining step, when an engine torque is greater than a predetermined reference engine torque, the clutch torque is greater than a predetermined reference clutch torque, and the measured engine speed change amount is less than a predetermined reference change amount, the controller determines that the transition period of change of the engine speed elapsed.

3. The method of claim 1, wherein the forgetting factor used in the second correction amount determination step is a value greater than 0 and not more than 1 and wherein the forgetting factor is set to a value close to 1 as the speed change amount of the input shaft of the transmission increases.

4. The method of claim 1, wherein the controller further performs a feed-forward value determination step for determining a feed-forward value for controlling the clutch actuator according to the engine torque and the operation amount of the accelerator pedal; and controls the clutch actuator by adding the feedback control amount determined in the feedback determination step to the feed-forward value.

5. The method of claim 4, wherein the controller determines the feed-forward value with a difference value obtained by subtracting a product of the change amount of the target engine speed according to the operation amount of the accelerator pedal by a moment of rotational inertia of the engine from the engine torque.

6. A method of controlling launch of a vehicle, comprising:
a setting step in which a controller sets a predetermined target engine speed of an engine according to an operation amount of an accelerator pedal;
a transient control step in which the controller feedback-controls a clutch torque based on the predetermined target engine speed and an engine speed to be measured;
a transient state determining step in which the controller determines, during performing of the transient control step, when a transition period of change of the engine speed elapsed based on whether an engine speed change amount is less than a predetermined reference engine speed;
a first correction amount determination step in which when it is determined as a result of performing the transient state determining step that the transition period of change of the engine speed elapsed, the controller determines a correction amount by using a difference between a measured engine speed input and the basic target engine speed;
a second correction amount determination step in which a previous correction amount is multiplied by a forgetting factor determined by reflecting the vehicle speed change amount;
a correction applying step in which the controller adds the correction amount to the predetermined target engine speed and then determines a final target engine speed;
an error determination step in which the controller determines an engine speed control error by using a difference between the final target engine speed and a measured engine speed; and
a feedback determination step in which the controller uses the engine speed control error and determines a feedback control amount for feedback-controlling a clutch actuator,
wherein the controller performs steps from the correction applying step to the feedback determination step repeatedly until the launch of the vehicle is completed and wherein the correction amount required for the correction applying step uses, at a first time, the correction amount obtained by the first correction amount determination step and then, at a time of the repeated performing of the steps, a second correction amount obtained by the second correction amount determination step.

7. The method of claim 6, wherein the forgetting factor used in the second correction amount determination step is a value greater than 0 and not more than 1 and wherein the forgetting factor is set to a value close to 1 as a speed change amount of the vehicle increases.

* * * * *